US011827516B2

(12) United States Patent
Sorensen et al.

(10) Patent No.: US 11,827,516 B2
(45) Date of Patent: Nov. 28, 2023

(54) SOLID HYDRIDE FLOW REACTOR

(71) Applicant: The Boeing Company, Chicago, IL (US)

(72) Inventors: Adam Eric Sorensen, Moorpark, CA (US); John J. Vajo, West Hills, CA (US); Jason Graetz, Calabasas, CA (US)

(73) Assignee: THE BOEING COMPANY, Arlington, VA (US)

( * ) Notice: Subject to any disclaimer, the term of this patent is extended or adjusted under 35 U.S.C. 154(b) by 63 days.

(21) Appl. No.: 17/449,970

(22) Filed: Oct. 5, 2021

(65) Prior Publication Data

US 2022/0219974 A1 Jul. 14, 2022

Related U.S. Application Data

(60) Provisional application No. 63/136,075, filed on Jan. 11, 2021.

(51) Int. Cl.
*C01B 3/04* (2006.01)
*B01J 7/00* (2006.01)
(Continued)

(52) U.S. Cl.
CPC .................... *C01B 3/04* (2013.01); *B01J 7/00* (2013.01); *H01M 8/04201* (2013.01);
(Continued)

(58) Field of Classification Search
None
See application file for complete search history.

(56) References Cited

U.S. PATENT DOCUMENTS 4,018,190 A * 4/1977 Henault ................ C01B 3/0005
123/3
5,710,360 A * 1/1998 Self ......................... A62D 3/40
204/158.21
(Continued)

FOREIGN PATENT DOCUMENTS

GB 1568374 A * 5/1980 ........... C01B 3/0005
JP 2007327534 A * 12/2007
(Continued)

OTHER PUBLICATIONS

Alvarez Rodriguez, C. (EP Examiner), Extended European Search Report dated May 18, 2022 in corresponding European Application No. 21215774.7, 11 pages.
(Continued)

*Primary Examiner* — Jennifer A Leung
(74) *Attorney, Agent, or Firm* — MH2 Technology Law Group LLP

(57) ABSTRACT

A hydride flow reactor includes a tank configured to receive a hydride fuel. The reactor also includes a tubular member coupled to the tank and configured to receive the hydride fuel from the tank. The reactor also includes a transporter positioned at least partially within the tubular member and configured to transport the hydride fuel through the tubular member. The reactor also includes a heater positioned at least partially around the tubular member and the transporter. The heater is configured to heat the hydride fuel in the tubular member to convert the hydride fuel into hydrogen gas and a reacted byproduct.

25 Claims, 8 Drawing Sheets

(51) Int. Cl.
*H01M 8/065* (2016.01)
*H01M 8/04082* (2016.01)

(52) U.S. Cl.
CPC ..... *H01M 8/065* (2013.01); *C01B 2203/0272* (2013.01); *C01B 2203/04* (2013.01); *C01B 2203/0855* (2013.01); *C01B 2203/1623* (2013.01); *C01B 2203/1638* (2013.01); *H01M 2250/20* (2013.01); *Y02E 60/36* (2013.01)

(56) References Cited

U.S. PATENT DOCUMENTS

| | | |
|---|---|---|
| 5,732,794 A | 3/1998 | Orlitzky |
| 6,811,764 B2 | 11/2004 | Jorgensen et al. |
| 6,866,836 B2 | 3/2005 | Jorgensen |
| 7,947,094 B2 | 5/2011 | Fiebig |
| 7,947,245 B2 | 5/2011 | Tada et al. |
| 8,889,097 B2 | 11/2014 | Brooks et al. |
| 10,608,270 B2 * | 3/2020 | Autrusson ........... H01M 8/0606 |
| 2004/0052722 A1 * | 3/2004 | Jorgensen ............ H01M 8/065 423/648.1 |
| 2004/0166057 A1 | 8/2004 | Schell et al. |

FOREIGN PATENT DOCUMENTS

| | | | |
|---|---|---|---|
| SU | 1467003 A | * 3/1989 | |
| WO | WO-2013171510 A1 | * 11/2013 | ............. B01J 8/087 |

OTHER PUBLICATIONS

Choi et al., "Kinetics Study of Solid Ammonia Borane Hydrogen Release—Modeling and Experimental Validation for Chemical Hydrogen Storage," Phys. Chem. Chem. Phys. (2014) 16, 7959, 10 pages.

Devarakonda et al., "Dynamic Modeling and Simulation Based Analysis of an Ammonia Borane (AB) Reactor System for Hydrogen Storage," ECS Transactions, 33 (1) 1959-1972 (2010), 15 pages.

* cited by examiner

SOLID HYDRIDE FLOW REACTOR

CROSS-REFERENCE TO RELATED APPLICATIONS

The present application claims the benefit of U.S. Provisional Application No. 63/136,075, filed Jan. 11, 2021, the disclosure of which is hereby incorporated by reference in its entirety.

FIELD OF THE DISCLOSURE

The present disclosure is directed to a solid hydride flow reactor. More particularly, the present disclosure is directed to systems and methods for continuous and variable conversion of a solid (e.g., powdered) metastable hydride fuel into a hydrogen gas.

BACKGROUND

Hydrogen fuel cell systems may generate high specific energies (e.g., >800 Wh/kg). However, hydrogen storage remains a challenge and limits scalability. The most common hydrogen storage method employed today includes high pressure (e.g., carbon fiber) hydrogen tanks. Although this storage method has a reasonable specific energy and energy density at large scale (e.g., >50 kWh), it is often too heavy and too spacious at medium and small scales (e.g., <10 kWh). In addition, the high pressure requirement limits the design flexibility of the storage system. Future electric and hybrid electric vehicles may require power systems with specific energies ≥700 Wh/kg.

SUMMARY

A hydride flow reactor is disclosed. The reactor includes a tank configured to receive a hydride fuel. The reactor also includes a tubular member coupled to the tank and configured to receive the hydride fuel from the tank. The reactor also includes a transporter positioned at least partially within the tubular member and configured to transport the hydride fuel through the tubular member. The reactor also includes a heater positioned at least partially around the tubular member and the transporter. The heater is configured to heat the hydride fuel in the tubular member to convert the hydride fuel into hydrogen gas and a reacted byproduct.

A vehicle is also disclosed. The vehicle includes a hydride flow reactor. The reactor includes a tank configured to receive a metastable hydride fuel. The metastable hydride fuel includes a solid powder. The metastable hydride fuel includes lithium aluminum hydride, aluminum hydride, or a combination thereof. The metastable hydride fuel has a hydrogen material density that is from about 30 kg/m$^3$ to about 200 kg/m$^3$. The reactor also includes a tubular member configured to receive the metastable hydride fuel from the tank. The reactor also includes an auger positioned within the tubular member. The reactor also includes a motor configured to rotate the auger, which moves the metastable hydride fuel through the tubular member. The reactor also includes a heater positioned at least partially around the tubular member and the auger. The heater is configured to heat the metastable hydride fuel in the tubular member to a temperature from about 100° C. to about 300° C. to convert the metastable hydride fuel into hydrogen gas and a reacted byproduct. The reactor also includes an outlet configured to discharge the hydrogen gas. The outlet includes a filter that is configured to prevent particles entrained in the hydrogen gas from being discharged through the outlet. The vehicle uses the hydrogen gas as a fuel. The reactor also includes a container configured to collect the reacted byproduct.

A method is also disclosed. The method includes introducing a hydride fuel into a tank. The method also includes transferring the hydride fuel from the tank into a tubular member. The method also includes moving the hydride fuel within the tubular member using an auger positioned within the tubular member. The method also includes heating a reaction zone within the tubular member using a heater to convert the hydride fuel into hydrogen gas and a reacted byproduct. The heater is positioned outside of the tubular member. The method also includes discharging the hydrogen gas through an outlet. The method also includes collecting the reacted byproduct in a container.

BRIEF DESCRIPTION OF THE DRAWINGS

The accompanying drawings, which are incorporated in and constitute a part of this specification, illustrate aspects of the present teachings and together with the description, serve to explain the principles of the present teachings.

Figure 1:
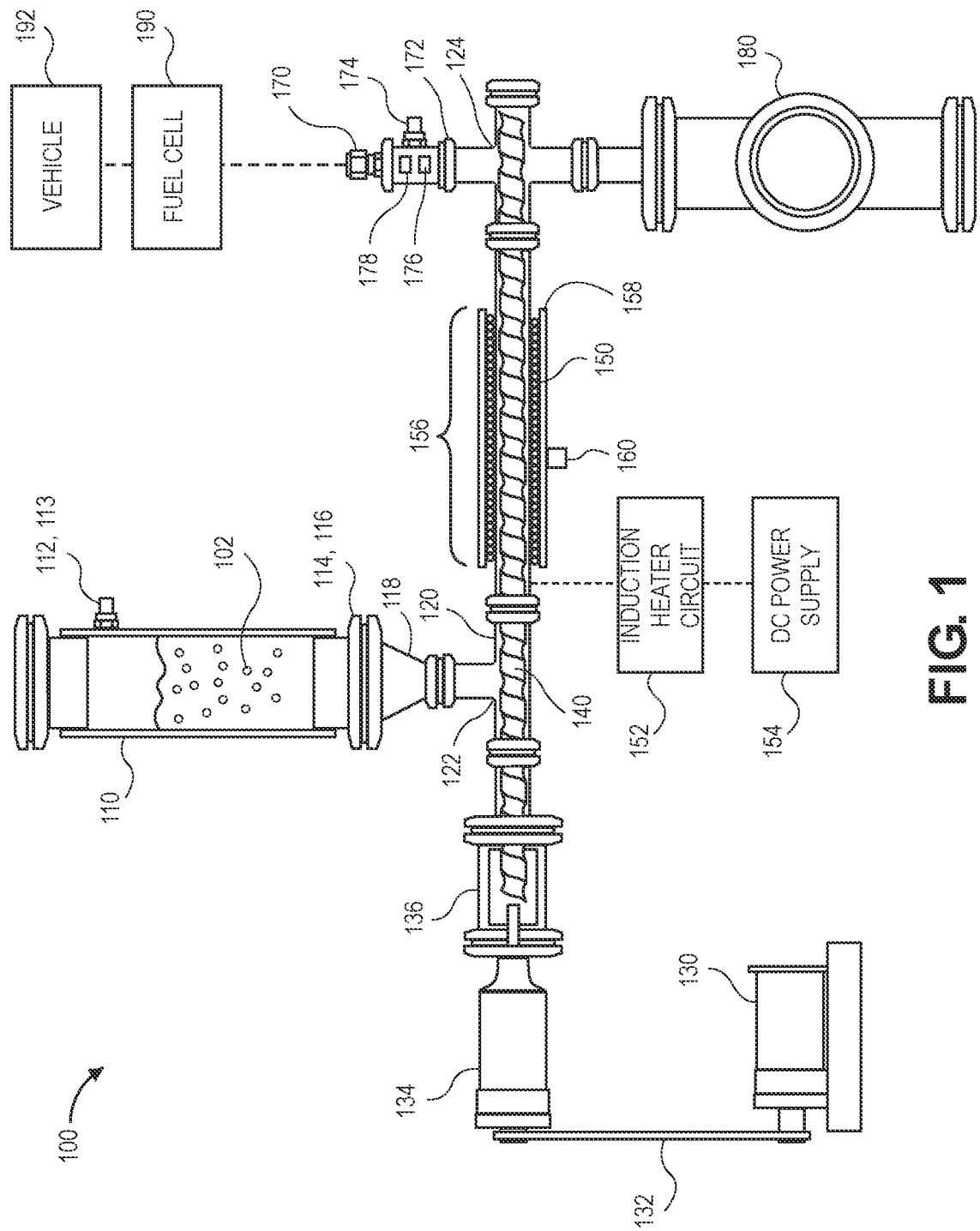
FIG. 1 illustrates a schematic view of a solid hydride flow reactor, according to an implementation.

It should be noted that some details of the figures have been simplified and are drawn to facilitate understanding rather than to maintain strict structural accuracy, detail, and scale.

DESCRIPTION

Reference will now be made in detail to the present teachings, examples of which are illustrated in the accompanying drawings. In the drawings, like reference numerals have been used throughout to designate identical elements.

In the following description, reference is made to the accompanying drawings that form a part thereof, and in which is shown by way of illustration specific examples of practicing the present teachings. The following description is, therefore, merely exemplary.

FIG. 1 illustrates a schematic view of a solid hydride flow reactor 100, according to an implementation. The reactor 100 is configured to perform a continuous and/or variable conversion of a hydride fuel 102 into a hydrogen gas. More particularly, the reactor 100 may be configured to produce a clean hydrogen gas, on demand, without high-pressure storage tanks, as described below.

The hydride fuel 102 may be solid (e.g., powdered). In other words, the hydride fuel 102 may not be or include a liquid or a slurry. The hydride fuel 102 may also be metastable. The hydride fuel 102 may be or include a primary (e.g., non-reversible) hydride that requires less heat than conventional hydrides to achieve thermal desorption. The hydride fuel 102 may be or include lithium aluminum hydride ($LiAlH_4$), aluminum hydride ($AlH_3$), or a combination thereof, which may be thermally decomposed within the reactor 100 to generate/release a hydrogen gas. The hydride fuel 102 may have a high gravimetric and/or volumetric density. For example, the hydride fuel 102 may have a gravimetric and/or volumetric density from about 30 $kg/m^3$ (on a material basis) to about 200 $kg/m^3$, about 40 $kg/m^3$ to about 175 $kg/m^3$, or about 50 $kg/m^3$ to about 150 $kg/m^3$. In another implementation, the hydride fuel 102 may have a gravimetric and/or volumetric density from about 50 $kg/m^3$ to about 100 $kg/m^3$, about 100 $kg/m^3$ to about 150 $kg/m^3$, or about 150 $kg/m^3$ to about 200 $kg/m^3$. For example, $LiAlH_4$ may have a hydrogen material density of about 78 $kg/m^3$, and $AlH_3$ may have a hydrogen material density of about 148 $kg/m^3$. These ranges are based on the known hydrogen material density from reference material(s).

The reactor 100 may include a tank (also referred to as a reservoir or hopper) 110 that is configured to receive and/or store the hydride fuel 102 therein. The tank 110 may be made from a polymer (e.g., polycarbonate), which is durable, air-tight, and optically-transparent. An upper portion of the tank 110 may include top seal 112, which may serve as a loading area when adding the hydride fuel 102 into the tank 110 in an inert atmosphere (e.g., a glove box). The top seal 112 may include a top flange and cap with a compression clamp. The top cap may be coupled to the flange, and may also include a pressure release valve 113, which may be configured to actuate into an open position to release pressure when the pressure reaches or exceeds a predetermined threshold (e.g., 10 PSI).

A lower portion of the tank 110 may include a bottom seal 114, which may include a flange and cap with a compression clamp. The tank 110 may also include a filter 116 that is configured to separate/remove particles (e.g., powder) from a gas flowing therethrough. This may prevent particles from clogging the pressure release valve 113. A substantially conical gravity feed adapter 118 may be coupled to and/or positioned below the tank 110. Although the hydride fuel 102 is shown as being transferred from the hopper 110 via a gravity feed, in other implementations, the hydride fuel 102 may also or instead be transferred from the tank 110 using a linear actuator (e.g., a pneumatic or hydraulic piston or plunger, an electrically-powered screw, etc.), or a vibratory-type delivery system (e.g., a vibratory feeder and/or vibratory hopper).

The reactor 100 may also include a tubular member 120 that is configured to receive the hydride fuel 102 from the tank 110. The tubular member 120 may include an inlet tee joint 122 and an outlet tee joint 124. For example, the hydride fuel 102 may flow from the tank 110, through the feed adapter 118 (e.g., due to gravity), through the inlet tee joint 122, and into the tubular member 120. In one implementation, the reactor 100 (e.g., the tank 110 and the tubular member 120) may be hermetically sealed to exclude ambient air, as the hydride reactants and/or byproducts may be air-sensitive and/or moisture-sensitive.

The reactor 100 may also include a motor 130. The motor 130 may be or include a variable speed motor. A chain 132 may be coupled to the motor 130 and configured to translate rotational motion from the motor 130. A rotary feedthrough 134 may be coupled to the chain 132. A rigid shaft coupler 136 may be coupled to the rotary feed through 134.

The reactor 100 may also include a transporter 140 that is positioned at least partially within the tubular member 120. As shown, the transporter 140 may extend at least partially through the inlet tee joint 122 and/or the outlet tee joint 124. The transporter 140 may be coupled to the shaft coupler 136. The motor 130, the chain 132, the rotary feedthrough 134, the shaft coupler 136, or a combination thereof may be configured to cause the transporter 140 to move (e.g., rotate) to transport the hydride fuel 102 through the tubular member 120 (e.g., to the right as shown in FIG. 1). In one example, the transporter 140 may be or include a powder feed auger.

The transporter 140 may have a lubricant (e.g., molybdenum disulfide: $MoS_2$) applied thereto. The lubricant may include a binder material, such as mineral oil or a similar paraffin-based material. After the lubricant is applied, the transporter 140 and/or lubricant may be heated to bake out and remove the binder material from the lubricant. The transporter 140 may have a graphite paint applied thereto, which may aid in measuring the temperature of the transporter 140.

The reactor 100 may also include a heater 150. The heater 150 may be positioned at least partially around the tubular member 120 and/or the transporter 140. The heater 150 may be configured to heat the hydride fuel 102 to a temperature from about 100° C. to about 300° C., about 150° C. to about 250° C., or about 175° C. to about 225° C., at which temperature the hydride fuel 102 generates/releases hydrogen gas and a reacted byproduct. The reacted byproduct may be, for example, aluminum metal and lithium hydride when the hydride fuel 102 is $LiAlH_4$. In another example, the reacted byproduct may be aluminum metal when the hydride fuel 102 is $AlH_3$. In one example, the heater 150 may initially heat the reaction zone 156 to a temperature from about 70° C. to about 150° C., about 80° C. to about 130° C., or about 90° C. to about 110° C., and the heater 150 may gradually increase the temperature in the reaction zone 156 to about 160° C. to about 300° C., about 180° C. to about 275° C., or about 200° C. to about 250° C. over a time period from about 1 minute to about 10 minutes, about 1 minute to about 5 minutes, or about 1 minute to about 3 minutes.

In one example, the heater 150 may be or include a resistive heating coil that may serve as a conductive heater. The heater 150 (e.g., the wire coil) may be coated with an enamel and/or resin (e.g., a PAC resin). In another example, the heater 150 may be or include an inductive heating coil. The heating coil may be wrapped helically around the tubular member 120 and/or the transporter 140. The reactor 100 may also include an induction heater circuit 152 and a DC power supply 154 (e.g., when the heater 150 is an inductive heating coil). Induction heating may improve the response time of on-demand hydrogen gas generation when compared to conventional heat conduction techniques. The heater 150 may be configured to heat the hydride fuel 102 within the tubular member 120. This may be referred to herein as a reaction zone 156 because the heat causes the hydride fuel 102 to react and convert into a hydrogen gas and a reacted byproduct.

In one implementation, the heater 150 may be at least partially surrounded by an insulation 158. The insulation 158 may direct the heat from the heater 150 inwards toward the reaction zone 156. The insulation 158 may also or instead reduce the amount of heat lost to the surrounding environment, thereby increasing the efficiency of the reactor 100. The insulation 158 may be or include a synthetic porous material (e.g., aerogel), a polyimide film (e.g., poly (4,4'-oxydiphenylene-pyromellitimide), or a combination thereof.

One or more temperature sensors (e.g., thermocouples) 160 may be configured to measure the temperature in the reaction zone 156. The temperature sensor(s) 160 may be positioned inside the tubular member 120 or outside the tubular member 120. When located outside of the tubular member 120, the temperature sensor(s) 160 may be positioned at least partially between coil windings of the heater 150. When located outside of the tubular member 120, the measurements from the temperature sensor(s) 160 may be used to estimate the temperature in the reaction zone 156.

The outlet tee joint 124 may be or include a phase separator that is configured to separate two phases from one another. For example, the phase separator may be configured to separate the hydrogen gas from the reacted byproduct.

The reactor 100 may also include a gas outlet 170 through which the hydrogen gas may flow. The gas outlet 170 may be coupled to or integral with an upper portion of the outlet tee joint 124. The gas outlet 170 may include a filter 172 that is configured to separate/remove particles from the hydrogen gas as the hydrogen gas flows through the gas outlet 170. The gas outlet 170 may also include a pressure release valve 174, which may be configured to actuate into an open position to release pressure when the pressure reaches or exceeds a predetermined threshold (e.g., 10 PSI). In one implementation, the gas outlet 170 may include a flow meter 176 that is configured to measure the rate at which the hydrogen gas flows through the gas outlet 170.

The reactor 100 may also include one or more pressure sensors (one is shown: 178) that is/are configured to measure the pressure within the reactor 100. As shown, the pressure sensor 178 is coupled to and/or proximate to the gas outlet 170. In another implementation, the pressure sensor 178 (or another pressure sensor) may be coupled to and/or proximate to the tank 110. The pressure release valve(s) 113, 174 may be actuated in response to the pressure measurements from the pressure sensor(s) 178.

The rate at which the hydrogen gas is produced may depend at least partially upon the feed rate of the hydride fuel 102 from the tank 110 into the tubular member 120. For example, as the feed rate varies (e.g., increases), the rate at which the hydrogen gas is produced may also vary (e.g., increase). The rate at which the hydrogen gas is produced may also or instead depend at least partially upon the rate at which the transporter 140 moves the hydride fuel 102 through the tubular member 120. For example, as the rate at which the transporter 140 moves (e.g., rotates) varies, the rate at which the hydrogen gas is produced may also vary. The rate at which the hydrogen gas is produced may also or instead depend at least partially upon the temperature in the reaction zone 156. For example, as the temperature varies (e.g., increases), the rate at which the hydrogen gas is produced may also vary (e.g., increase).

The reactor 100 may also include a collector 180 that is configured to receive/store the reacted byproduct. The collector 180 may be coupled to or integral with a lower portion of the outlet tee joint 124.

A fuel cell 190 may be configured to receive and/or store the hydrogen gas produced by the reactor 100. The reactor 100, the hydrogen gas, and/or the fuel cell 190 may be configured to achieve a specific energy of up to about 250 Wh/kg, up to about 500 Wh/kg, about 1000 Wh/kg, or about 1500 Wh/kg. In another embodiment, the reactor 100, the hydrogen gas, and/or the fuel cell 190 may be configured to achieve a specific energy from about 500 Wh/kg to about 750 Wh/kg, about 750 Wh/kg to about 1000 Wh/kg, about 1000 Wh/kg to about 1500 Wh/kg, or more.

In one implementation, the reactor 100 may be coupled to and/or positioned within a vehicle 192, and the vehicle 192 may use the hydrogen gas discharged from the outlet 170 as a fuel. The vehicle 192 may be or include an electric and/or hybrid-electric vehicle. For example, the vehicle 192 may be or include an aircraft such as an airplane, a helicopter, an unmanned aerial vehicle (UAV), a spacecraft, or the like. The vehicle 192 may also or instead include a car, a train, a boat, an underwater vehicle, or the like.

Figure 2A:
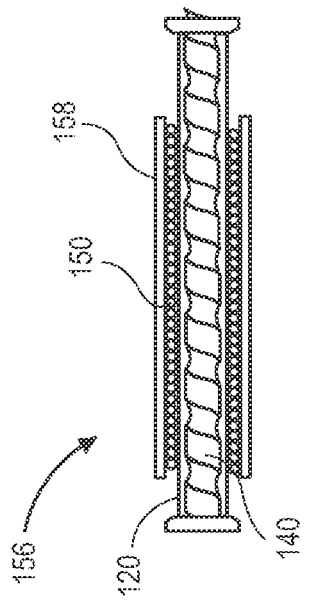
FIG. 2A illustrates a cross-sectional side view of a reaction zone of the reactor, according to an implementation.

FIG. 2A illustrates a cross-sectional side view of the reaction zone 156 of the reactor 100, according to an implementation. In this implementation, the tubular member 120 is made from a metal (e.g., steel), and the transporter 140 is made from a metal (e.g., steel). The heater 150 is a resistive heating coil, and the insulation 158 is positioned at least partially around the heater 150.

Figure 2B:
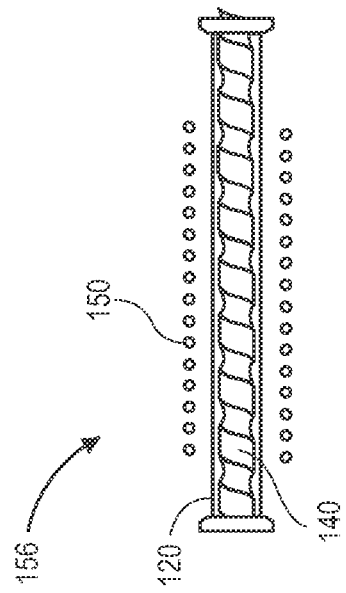
FIG. 2B illustrates a cross-sectional side view of the reaction zone of the reactor, according to another implementation.

FIG. 2B illustrates a cross-sectional side view of the reaction zone 156 of the reactor 100, according to an implementation. In this implementation, the tubular member 120 is made from a metal (e.g., steel), and the transporter 140 is made from a polymer (e.g., polyether ether ketone). Switching the transporter 140 from metal to polymer may reduce friction and binding because the polymer is chemically dissimilar from the metallic tubular member 120. In addition, switching the transporter 140 from metal to polymer may reduce the weight and/or density (e.g., $5x$ less) of the transporter 140. The heater 150 is a resistive heating coil, and the insulation 158 is positioned at least partially around the heater 150.

Figure 2C:
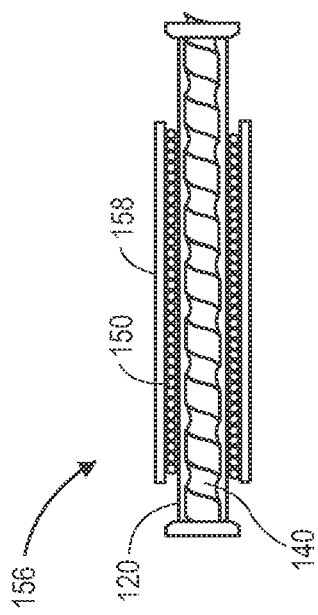
FIG. 2C illustrates a cross-sectional side view of the reaction zone of the reactor, according to another implementation.

FIG. 2C illustrates a cross-sectional side view of the reaction zone 156 of the reactor 100, according to an implementation. In this implementation, the tubular member 120 is made from a polymer (e.g., polyether ether ketone), and the transporter 140 is made from a metal (e.g., steel). Switching the tubular member 120 from metal to polymer may reduce friction and binding because the polymer is chemically dissimilar from the metallic transporter 140. The heater 150 is an inductive heating coil, and the insulation 158 is omitted. The inductive heater 150 may heat the metallic transporter 140, but may not directly heat the tubular member 120, which is made of polymer. The heat from the metallic transporter 140 may be transferred to the hydride fuel 102. Because this heat is occurring from inside the tubular member 120, and the polymer has a relatively low thermal conductivity, heat losses may be reduced, and heating efficiency may be increased. The weight/density of the polymer is also less than that of the metal.

In an example, hydrogen dehydrogenation is performed in the reactor 100 where the tubular member 120 is made from a polymer, and the transporter 140 is made from metal. The process is performed in an argon-filled glove box. The tubular member 120 is 6 inches long with a 0.56 inch inner diameter and a 0.75 inch outer diameter. The transporter 140 is a metallic auger that is 3 inches long. The region around the auger is filled with 1.436 g of LiAlH$_4$ hydride catalyzed with 0.03 mol % TiF$_3$. A 7 turn, 3.75 inch diameter induction heating coil 150 is placed around the section of the polymeric tubular member 120 containing the auger 140 and the hydride. The top of the tubular member 120 is sealed and held in place with a plastic syringe using a metal clamp. The plastic syringe is used to avoid any additional metal being proximate to the heating coil 150. The heating coil 150 is powered with the inductive heating circuit 152, which in turn is powered by a 24 VDC power supply 154.

Figure 2D:
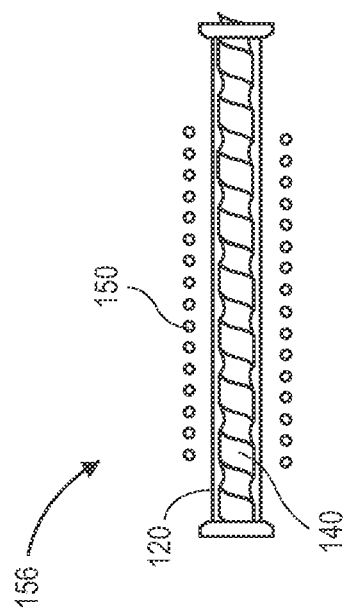
FIG. 2D illustrates a cross-sectional side view of the reaction zone of the reactor, according to another implementation.

FIG. 2D illustrates a cross-sectional side view of the reaction zone 156 of the reactor 100, according to an implementation. In this implementation, the tubular member 120 is made from a polymer (e.g., polyether ether ketone), and the transporter 140 is made from a polymer (e.g., polyether ether ketone). The heater 150 is an inductive heating coil, and the insulation 158 is omitted. In this example, induction heating is used to directly heat the hydride fuel 102. The hydride fuel 102 is (at least initially) non-metallic and may not be heated by induction. However, electrically conductive additives may be added to the hydride powder 102. For example, the electrically conductive additive may be or include from about 1 wt % to about 30 wt %, about 5 wt % to about 25 wt %, or about 10 wt % to about 20 wt % carbon powder, where wt % refers to weight of total solids. In another example, the electrically conductive additive may be or include from about 1 wt % to about 30 wt %, about 5 wt % to about 25 wt %, or about 10 wt % to about 20 wt % metallic (e.g., iron) powder, where wt % refers to weight of total solids. The additive may transfer heat to the hydride fuel 102 within the flowing powder bed to enable efficient heating. The hydride fuel may also comprise a lubricant, wherein the lubricant comprises graphite, molybdenum disulfide, or a combination thereof.

Figure 3:
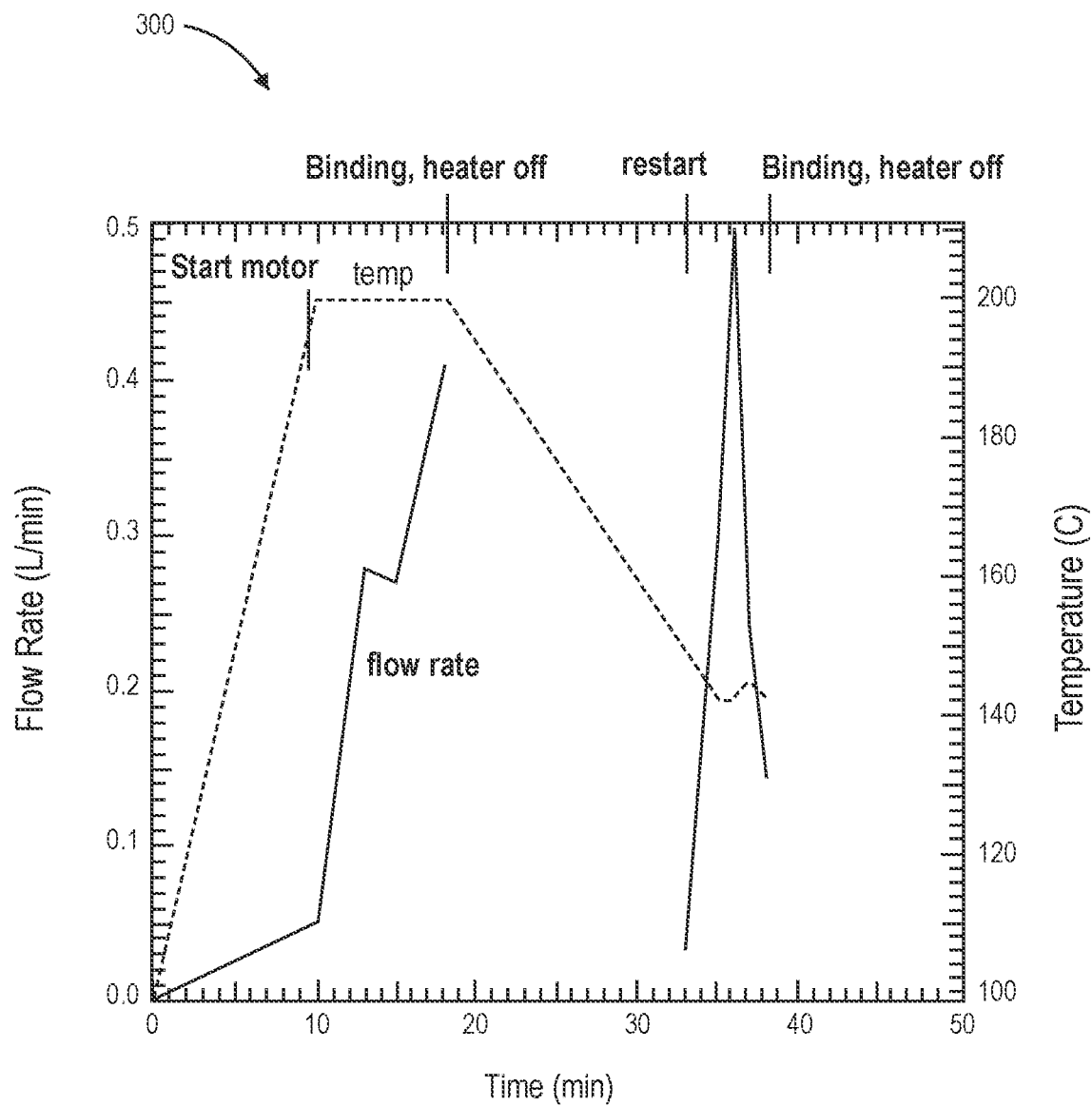
FIG. 3 illustrates a graph showing the flow rate of the evolved hydrogen gas and temperature of the hydride fuel in the reaction zone versus time, according to an implementation.

FIG. 3 illustrates a graph 300 showing the flow rate and temperature of the hydride fuel 102 in the reaction zone 156 versus time, according to an implementation. The transporter (e.g., auger) 140 may rotate from about 1 revolution to about 20 revolutions, about 2 revolutions to about 15 revolutions, or about 3 revolutions to about 15 revolutions. The rate of rotation may be from about 0.5 RPM to about 5 RPM, about 1 RPM to about 4 RPM, or about 2 RPM to about 3 RPM. This may move the hydride fuel 102 from about 2 cm to about 20 cm, about 3 cm to about 15 cm, or about 4 cm to about 10 cm within the tubular member 120, which may be the length of the reaction zone 156. The reaction zone 156 may include from about 0.5 g to about 5 g, about 1 g to about 4 g, or about 1.5 g to about 3 g of the hydride fuel 102 therein. The residence time of the hydride fuel 102 in the reaction zone 156 may be from about 30 seconds to about 5 minutes, about 1 minute to about 4 minutes, or about 2 minutes to about 3 minutes. The reactor 100 may run from about 30 minutes to about 5 hours, about 1 hour to about 4 hours, or about 2 hours to about 3 hours.

In an example, given a hydrogen content of 7.2 wt % (e.g., for catalyzed LiAlH$_4$) and 90% decomposition, the hydrogen gas flow rate may be about 1 liter for every 5 rotations of the auger 140. At about 2 RPM, this translates to a flow rate from about 0.1 L/min to about 2 L/min, about 0.2 L/min to about 1.5 L/min, or about 0.3 L/min to about 1 L/min. As shown, the reactor 100 may be started with a temperature of about 200° C., and the flow rate immediately increases to about 0.4 L/min, indicating about 90% hydrogen gas recovery.

Figure 4:
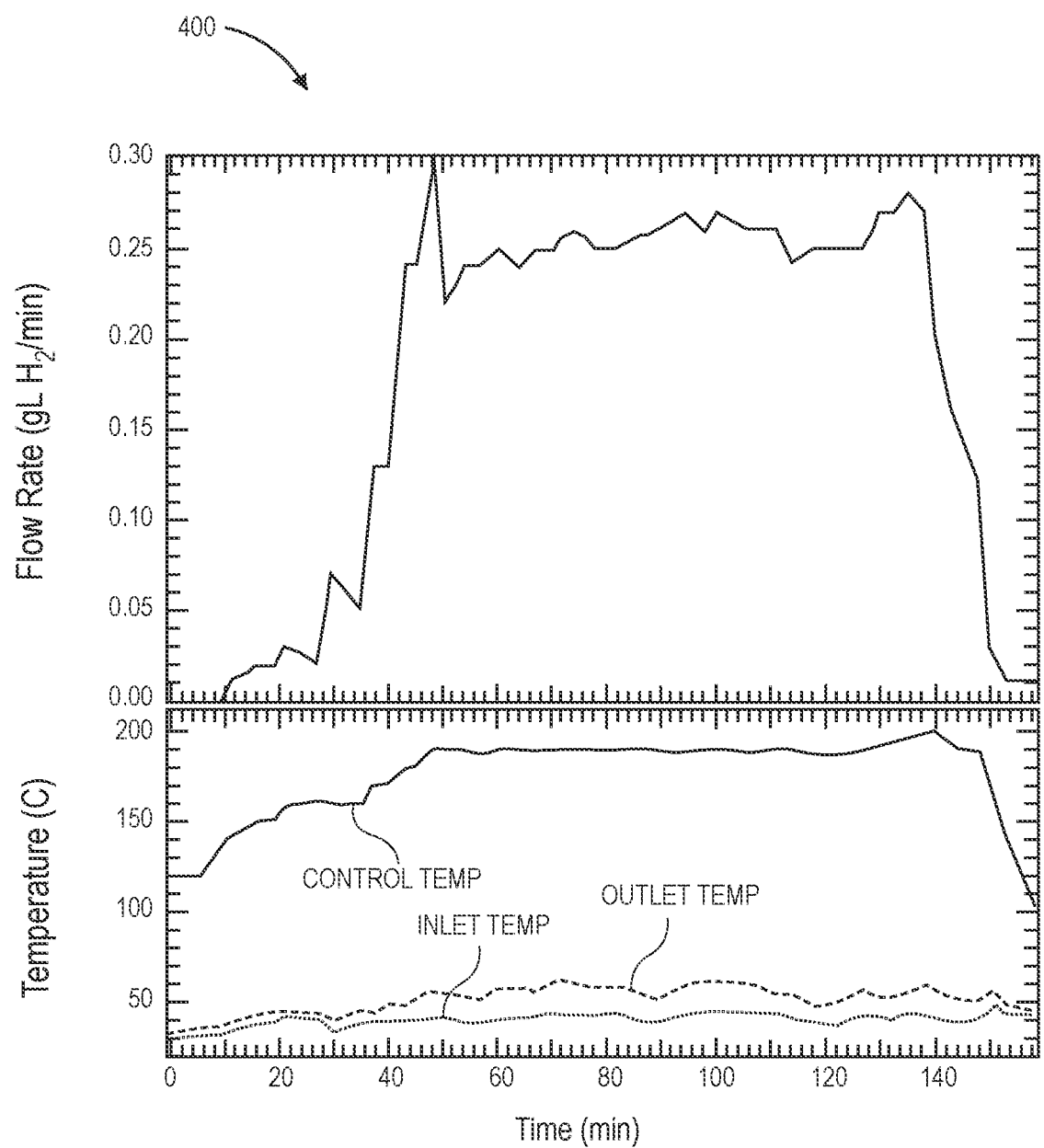
FIG. 4 illustrates another graph showing the flow rate of the evolved hydrogen gas and temperature of the hydride fuel in the reaction zone versus time, according to an implementation.

FIG. 4 illustrates another graph 400 showing the flow rate and temperature of the hydride fuel 102 in the reaction zone 156 versus time, according to an implementation. In this example, 115 g of LiAlH$_4$ (catalyzed with 3 mol % TiF$_3$) is introduced into the reactor 100. The reactor 100 runs for about 2 hours with an average flow rate from about 0.1 L/min to about 1 L/min, about 0.15 L/min to about 0.75 L/min, or about 0.2 L/min to about 0.5 L/min at a rate from about 0.5 RPM to about 5 RPM, about 1 RPM to about 4 RPM, or about 2 RPM to about 3 RPM. The hydrogen recovery is from about 30% to about 70%, about 40% to about 60%, or about 45% to about 55%.

Figure 5:
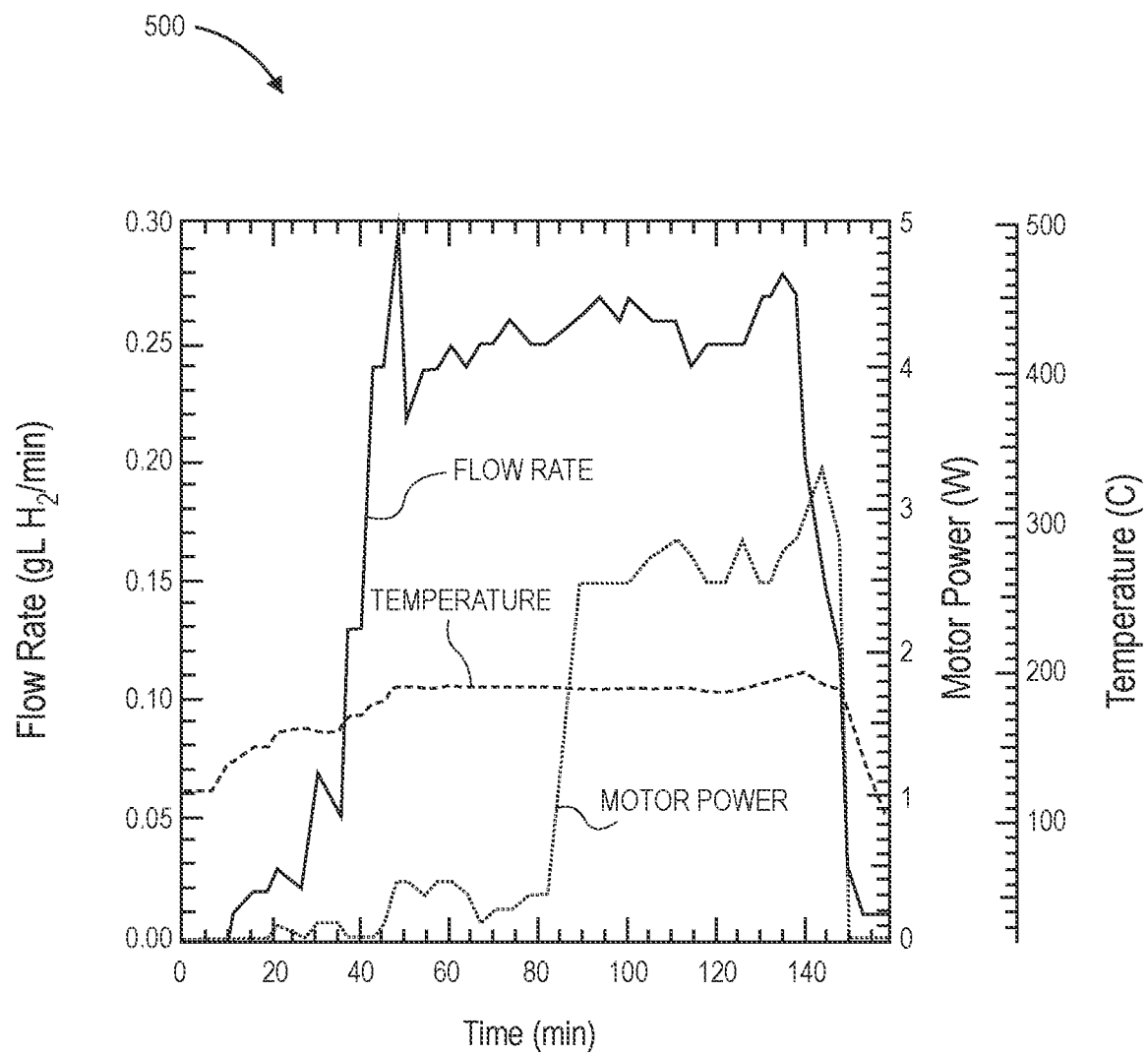
FIG. 5 illustrates another graph showing the flow rate of the evolved hydrogen gas and temperature of the hydride fuel in the reaction zone versus time, according to an implementation.

FIG. 5 illustrates another graph 500 showing the flow rate of hydrogen gas and temperature of the hydride fuel 102 in the reaction zone 156 versus time, according to an implementation. During the early stages of the run, the power required to turn the motor 130 is relatively low (e.g., from about 0.1 W to about 1 W, about 0.2 W to about 0.5 W, or about 0.25 W to about 0.35 W). After time (e.g., about 85 minutes), the power increases to between about 1 W and about 3 W, about 1.5 W and about 2.5 W, or about 1.75 W and about 2 W with relatively no change in motor speed or reaction temperature. About 58 g of the hydride fuel 102 passed through the reactor 100, and the remaining 57 g is left unreacted.

In another embodiment, the flow rate of the hydride fuel 102 and/or the hydrogen gas through the reactor 100 (e.g., the tubular member 120) may be from about 0.1 L/min to about 1 L/min, about 0.2 L/min to about 0.8 L/min, or about 0.3 L/min to about 0.5 L/min. As will be appreciated, larger systems may evolve more hydrogen per unit time. For automotive applications, the fuel may be depleted in about 1 hour to about 10 hours, about 2 hours to about 8 hours, or about 3 hours to about 5 hours. This may be normalized to the amount of total fuel stored in the fuel cell 190. For example, the fuel cell may release from about 10% to about 100% of the stored hydrogen per hour, from about 20% to about 80% of the stored hydrogen per hour, or from about 20% to about 50% of the stored hydrogen per hour.

Figure 6:
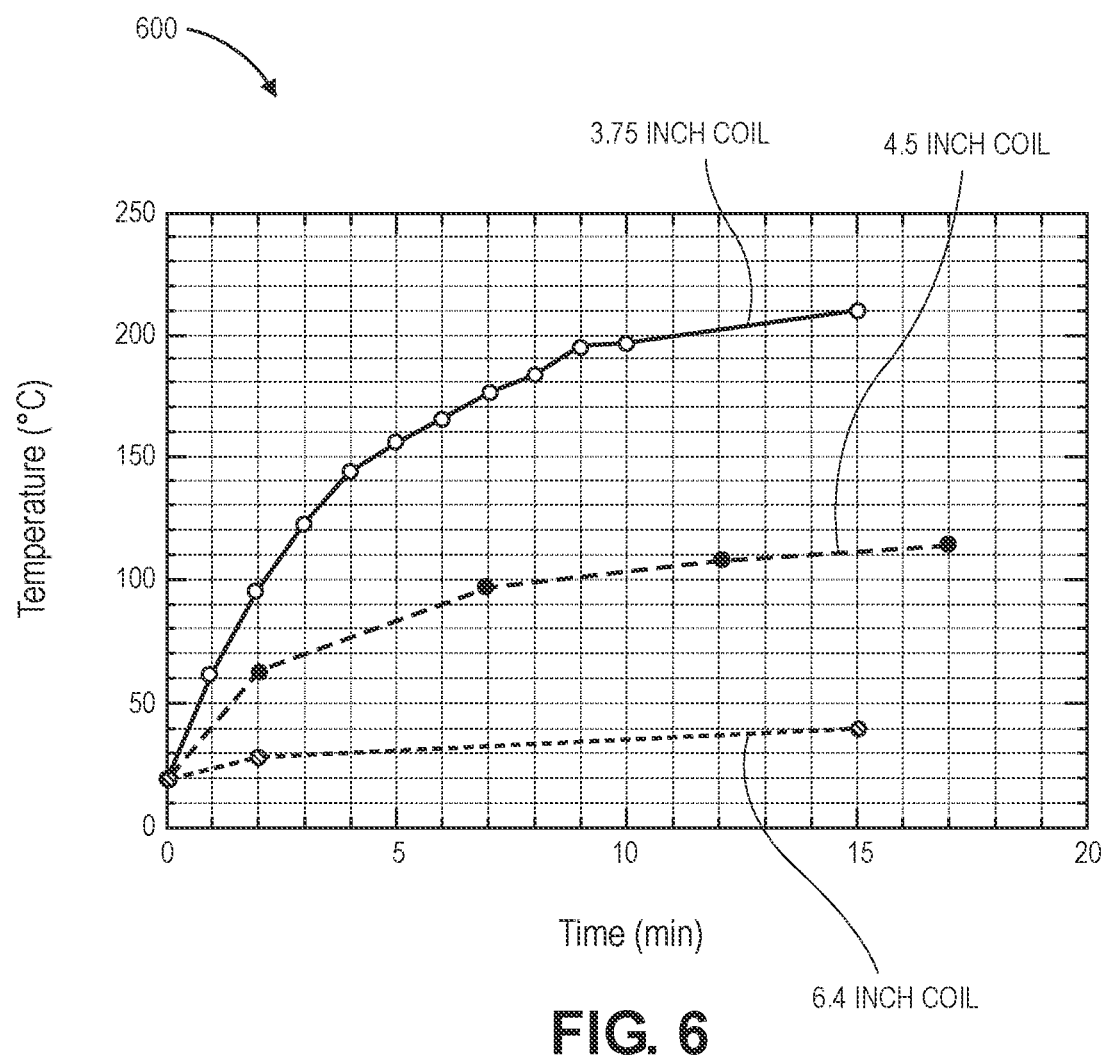
FIG. 6 illustrates a graph showing temperatures of three differently-sized heaters versus time, according to an implementation.

FIG. 6 illustrates a graph 600 showing temperatures of three differently-sized heaters 150 versus time, according to an implementation. In FIG. 6, the heating coils are helical, and the term "diameter" refers to the diameter of the helix, not the diameter of the coil itself. The heater (e.g., heating coil) 150 with the 3.75 inch diameter provided an optimal heating profile for dehydrogenation of the LiAlH$_4$ hydride fuel 102. As shown, a temperature of about 150° C. is reached in about 5 minutes, and a temperature of about 200° C. is reached in about 10 minutes. Larger diameter heater coils (e.g., 4.5 inches and 6.4 inches) heat too slowly while smaller coils (data not shown) heat too quickly. Power measurements with and without the transporter (e.g., auger) 140 in the heater 150 indicate that the heating power to the heater 150 increases with decreasing coil diameter: from 3 W at 6.5 inches, to 9 W at 4.5 inches, to 17 W at 3.75 inches. The temperature is measured with an optical pyrometer. Heating is performed in air with the transporter 140, not in the polymer tubular member 120, positioned vertically in the center of the heater 150.

Figure 7:
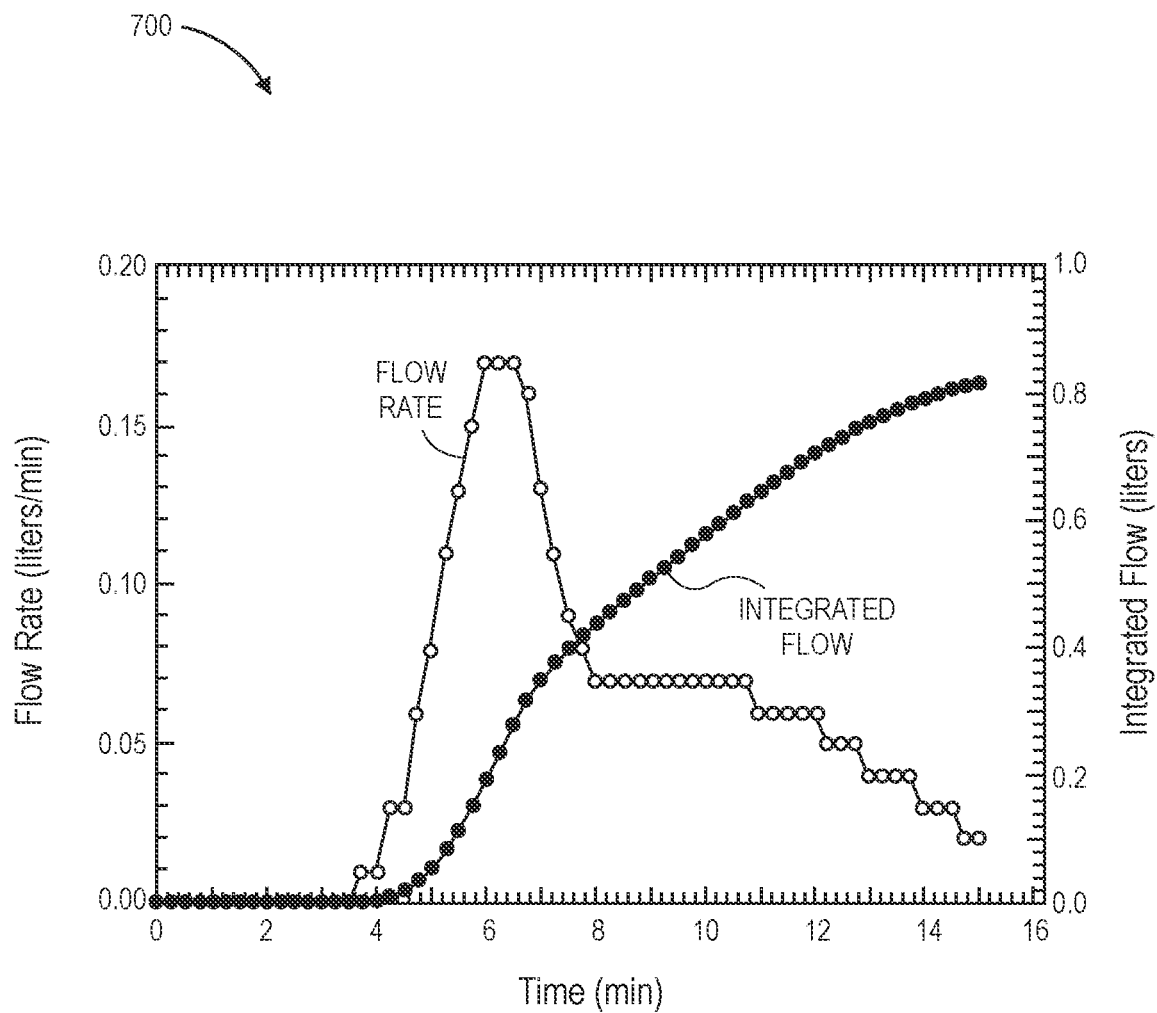
FIG. 7 illustrates a graph showing flow rate of the hydrogen gas and integrated flow of the hydrogen gas versus time, according to an implementation.

FIG. 7 illustrates a graph 700 showing flow rate and integrated flow versus time, according to an implementation. In the example shown in FIG. 7, the metallic transporter (e.g., auger) 140 is inductively heated inside the polymeric tubular member 120. The flow rate begins to rise at about 3.5 minutes and about 135° C. The flow rate peaks at about 0.17 liters/minute and then decreases to about 0.03 liters per minute at about 15 minutes. The integrated flow is about 0.82 liters, which corresponds to about 0.033 mole-H$_2$ or 0.067 g-H$_2$. As used herein, "integrated flow" refers to the total amount of evolved hydrogen gas. The measured weight loss of the assembled polymeric tubular member 120 is 0.088 g. From the weight of the hydride fuel 102 added (1.436 g), and assuming a capacity of about 7 wt % for the LiAlH$_4$+0.03 TiF$_3$ mixture, the theoretical weight of hydrogen is about 0.100 g. These values indicate that a significant dehydrogenization of the hydride (e.g., about 67%) is achieved by inductively heating the transporter 140.

The induction heating of the hydride fuel 102 in the reactor 100 with the metallic transporter 140 is performed a second time. The flow rate increases to about 0.12 L/minute within less than a minute after showing signs of positive pressure outward on the flow meter 176. At this point, the heater 150 is shut off. The flow rate starts to decrease a few seconds later, indicating a quick response time and strong correlation to the inductive heating energy going into the transporter 140.

Figure 8:
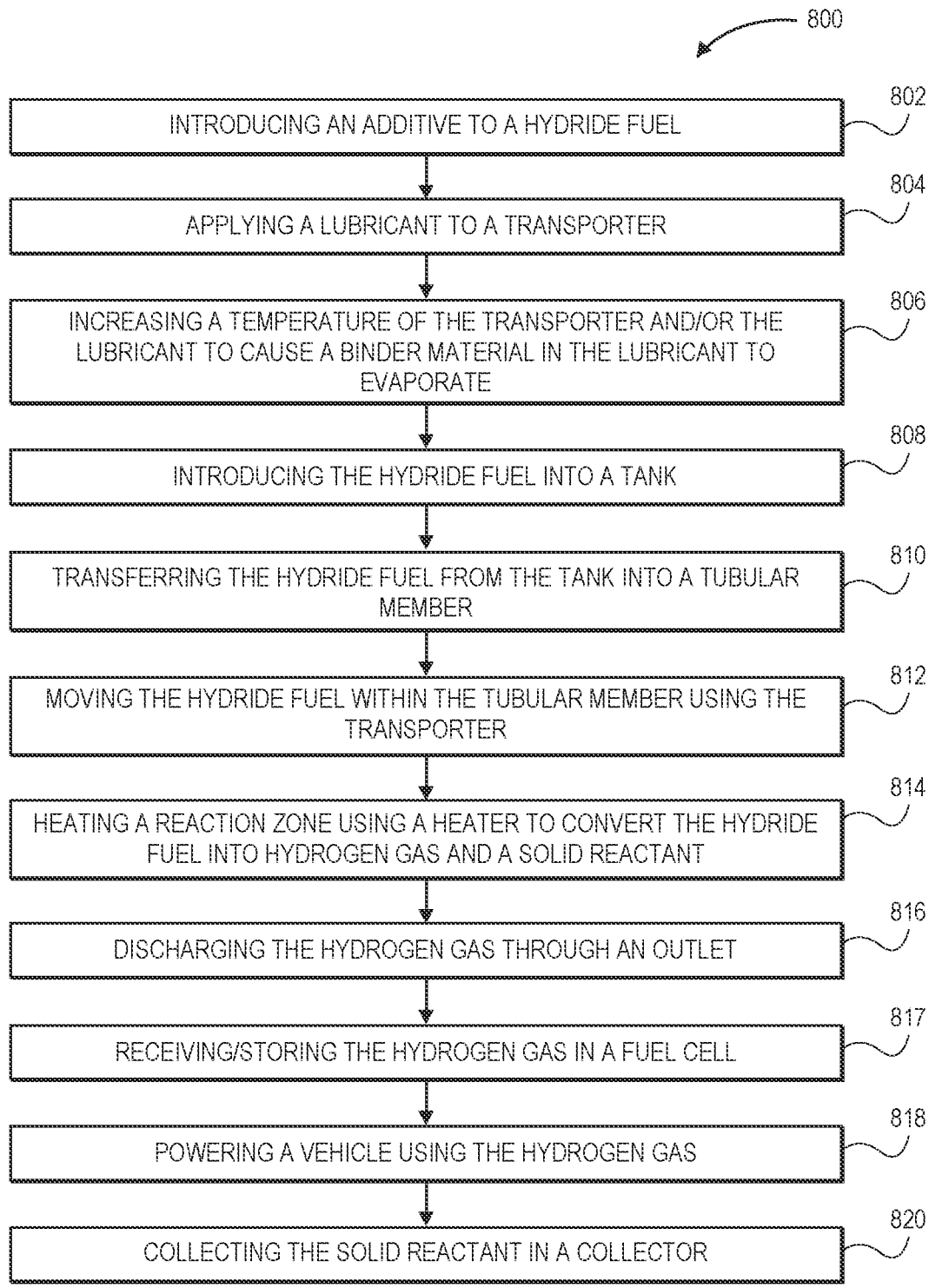
FIG. 8 illustrates a flowchart of a method for converting a hydride fuel into a hydrogen gas, according to an implementation.

FIG. 8 illustrates a flowchart of a method 800 for converting the hydride fuel 102 into hydrogen gas, according to an implementation. An illustrative order of the method 800 is provided below; however, one or more steps of the method 800 may be performed in a different order, performed simultaneously, repeated, or omitted.

The method 800 may include introducing an additive to the hydride fuel 102, as at 802. As discussed above, the additive may be or include a carbon powder or a metallic powder. The method 800 may also include applying a lubricant to the transporter (e.g., the auger) 140, as at 804. The method 800 may also include increasing a temperature of the transporter 140 and/or the lubricant to cause a binder material in the lubricant to at least partially evaporate, as at 806. This may leave behind the lubricant with little or no binder material.

The method 800 may include introducing the hydride fuel 102 into the tank 110, as at 808. The method 800 may also include transferring the hydride fuel 102 from the tank into the tubular member 120, as at 810. The method 800 may also include moving the hydride fuel 102 within the tubular member 120 using the transporter 140, as at 812. For example, the transporter 140 may be or include an auger that is rotated by the motor 130, which moves the hydride fuel 102 within the tubular member 120. The method 800 may also include heating the reaction zone 156 using the heater 150 to convert the hydride fuel 102 into hydrogen gas and a reacted byproduct, as at 814. The method 800 may also include discharging the hydrogen gas through the outlet 170, as at 816. The method 800 may also include receiving/storing the hydrogen gas in the fuel cell 190, as at 817. The method 800 may also include powering the vehicle 192 using the hydrogen gas, as at 818. The hydrogen gas may be supplied to the vehicle 190 directly from the outlet 170 or from the fuel cell 190. The method 800 may also include collecting the reacted byproduct in the collector 180, as at 820.

As used herein, the terms "inner" and "outer"; "up" and "down"; "upper" and "lower"; "upward" and "downward"; "upstream" and "downstream"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members." Similarly, the terms "bonded" and "bonding" refer to "directly bonded to" or "bonded to via one or more intermediate elements, members, or layers."

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. As used herein, the terms "a", "an", and "the" may refer to one or more elements or parts of elements. As used herein, the terms "first" and "second" may refer to two different elements or parts of elements. As used herein, the term "at least one of A and B" with respect to a listing of items such as, for example, A and B, means A alone, B alone, or A and B. Those skilled in the art will recognize that these and other variations are possible. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the intended purpose described herein. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A hydride flow reactor, comprising:
    a tank containing a hydride fuel, wherein the hydride fuel comprises a lubricant, and wherein the lubricant comprises graphite, molybdenum disulfide, or a combination thereof;
    a tubular member coupled to the tank and configured to receive the hydride fuel from the tank;
    a transporter positioned at least partially within the tubular member and configured to transport the hydride fuel through the tubular member; and
    a heater positioned at least partially around the tubular member and the transporter, wherein the heater is configured to heat the hydride fuel in the tubular member to convert the hydride fuel into hydrogen gas and a reacted byproduct.

2. The hydride flow reactor of claim 1, wherein the hydride fuel comprises a solid powder that is metastable.

3. The hydride flow reactor of claim 2, wherein the hydride fuel comprises lithium aluminum hydride, aluminum hydride, or a combination thereof.

4. The hydride flow reactor of claim 2, wherein the hydride fuel also comprises a conductive additive, wherein the conductive additive comprises from about 1 wt % to about 20 wt % carbon powder, about 1 wt % to about 20 wt % metal powder, or a combination thereof, where wt % refers to weight of total solids.

5. The hydride flow reactor of claim 1, wherein the transporter comprises an auger positioned within the tubular member and configured to rotate to transport the hydride fuel through the tubular member.

6. The hydride flow reactor of claim 5, further comprising a lubricant applied to the auger, wherein the lubricant does not comprise a binder material.

7. The hydride flow reactor of claim 5, further comprising a motor coupled to the auger and configured to rotate the auger, and wherein a rate at which the motor rotates the auger controls a rate at which the hydride fuel is transported through the tubular member.

8. The hydride flow reactor of claim 1, wherein the tank, the tubular member, or both are hermetically sealed.

9. The hydride flow reactor of claim 1, further comprising:
   a pressure sensor that is configured to measure a pressure of the hydrogen gas; and
   a valve that is configured to actuate from a first position to a second position when the pressure exceeds a threshold.

10. The hydride flow reactor of claim 1, further comprising a temperature sensor positioned outside of the tubular member that is configured to measure a temperature in the tubular member, wherein a rate at which the transporter transports the hydride fuel through the tubular member is adjusted in response to the measured temperature to achieve a predetermined decomposition rate.

11. The hydride flow reactor of claim 1, further comprising a temperature sensor positioned outside of the tubular member that is configured to measure a temperature in the tubular member, wherein the heater is configured to adjust an amount of heat introduced into the tubular member in response to the measured temperature to achieve a predetermined decomposition rate.

12. The hydride flow reactor of claim 1, further comprising:
   a phase separator configured to separate the hydrogen gas from the reacted byproduct;
   an outlet downstream from the phase separator and configured to discharge the hydrogen gas, wherein the outlet comprises a filter that is configured to prevent particles entrained in the hydrogen gas from being discharged through the outlet; and
   a container downstream from the phase separator and configured to collect the reacted byproduct.

13. The hydride flow reactor of claim 1, wherein the heater comprises a wire coil that is wound helically around the tubular member, and wherein a diameter of the helix is 3.75 inches.

14. A vehicle, comprising:
   a hydride flow reactor comprising:
      a tank containing a metastable hydride fuel, wherein the metastable hydride fuel comprises a solid powder, wherein the metastable hydride fuel comprises lithium aluminum hydride, aluminum hydride, or a combination thereof, wherein the metastable hydride fuel comprises a lubricant, wherein the lubricant comprises graphite, molybdenum disulfide, or a combination thereof, and wherein the metastable hydride fuel comprises a hydrogen material density that is from about 30 kg/m$^3$ to about 200 kg/m$^3$;
      a tubular member configured to receive the metastable hydride fuel from the tank;
      a transporter positioned within the tubular member and configured to transport the hydride fuel through the tubular member, wherein the transporter comprises an auger;
      a motor configured to rotate the auger, which moves the metastable hydride fuel through the tubular member;
      a heater positioned at least partially around the tubular member and the auger, wherein the heater is configured to heat the metastable hydride fuel in the tubular member to a temperature from about 100° C. to about 300° C. to convert the metastable hydride fuel into hydrogen gas and a reacted byproduct;
      an outlet configured to discharge the hydrogen gas, wherein the outlet comprises a filter that is configured to prevent particles entrained in the hydrogen gas from being discharged through the outlet, and wherein the vehicle uses the hydrogen gas as a fuel; and
      a container configured to collect the reacted byproduct.

15. The vehicle of claim 14, wherein the tubular member and the auger comprise a metal, wherein the heater comprises a resistive heater, and wherein the hydride flow reactor further comprises an insulator positioned around the tubular member and the heater.

16. The vehicle of claim 14, wherein the tubular member comprises a metal, wherein the auger comprises a polymer, wherein the heater comprises a resistive heater, and wherein the hydride flow reactor further comprises an insulator positioned around the tubular member and the heater.

17. The vehicle of claim 14, wherein the tubular member comprises a polymer, wherein the auger comprises a metal, and wherein the heater comprises an inductive heater.

18. The vehicle of claim 14, wherein the tubular member and the auger comprise a polymer, and wherein the heater comprises an inductive heater.

19. The vehicle of claim 14, wherein the heater comprises a wire coil that is wound helically around the tubular member, and wherein the hydride flow reactor further comprises a temperature sensor positioned at least partially between two windings of the wire coil.

20. The vehicle of claim 14, wherein the vehicle comprises an electric or hybrid-electric aircraft that uses the hydrogen gas as the fuel.

21. A method, comprising:
   introducing a hydride fuel into a tank of a hydride flow reactor, wherein the hydride fuel comprises a lubricant, and wherein the lubricant comprises graphite, molybdenum disulfide, or a combination thereof;
   transferring the hydride fuel from the tank into a tubular member, wherein the tubular member is coupled to the tank and configured to receive the hydride fuel from the tank;
   moving the hydride fuel through the tubular member using a transporter positioned within the tubular member, wherein the transporter comprises an auger;
   heating the hydride fuel in a reaction zone within the tubular member using a heater to convert the hydride fuel into hydrogen gas and a reacted byproduct, wherein the heater is positioned around the tubular member and the transporter;
   discharging the hydrogen gas through an outlet; and
   collecting the reacted byproduct in a container.

22. The method of claim 21, wherein the hydride fuel comprises a metastable solid powder, wherein the hydride fuel comprises lithium aluminum hydride, aluminum hydride, or a combination thereof, and wherein the hydride fuel comprises a hydrogen material density that is from about 30 kg/m³ to about 200 kg/m³.

23. The method of claim 21, further comprising adding a conductive additive to the hydride fuel, wherein the conductive additive comprises from about 1 wt % to about 30 wt % carbon powder, about 1 wt % to about 30 wt % metal powder, or a combination thereof.

24. The method of claim 21, wherein heating the reaction zone increases a temperature of the hydride fuel in the reaction zone from between about 100° C. and about 150° C. to between about 200° C. and about 300° C. over a period of time from about 5 seconds to about 10 minutes.

25. The method of claim 21, further comprising:
applying a lubricant to the auger, wherein the lubricant comprises a binder material; and
increasing a temperature of the lubricant to evaporate the binder material from the lubricant prior to moving the hydride fuel within the tubular member using the auger.

* * * * *